Dec. 16, 1958    B. M. STRINGFELLOW    2,864,411
BAND SAW BLADE FOR USE WITH POWER DRIVEN BAND
SAWS FOR CUTTING MEAT
Filed Dec. 13, 1957
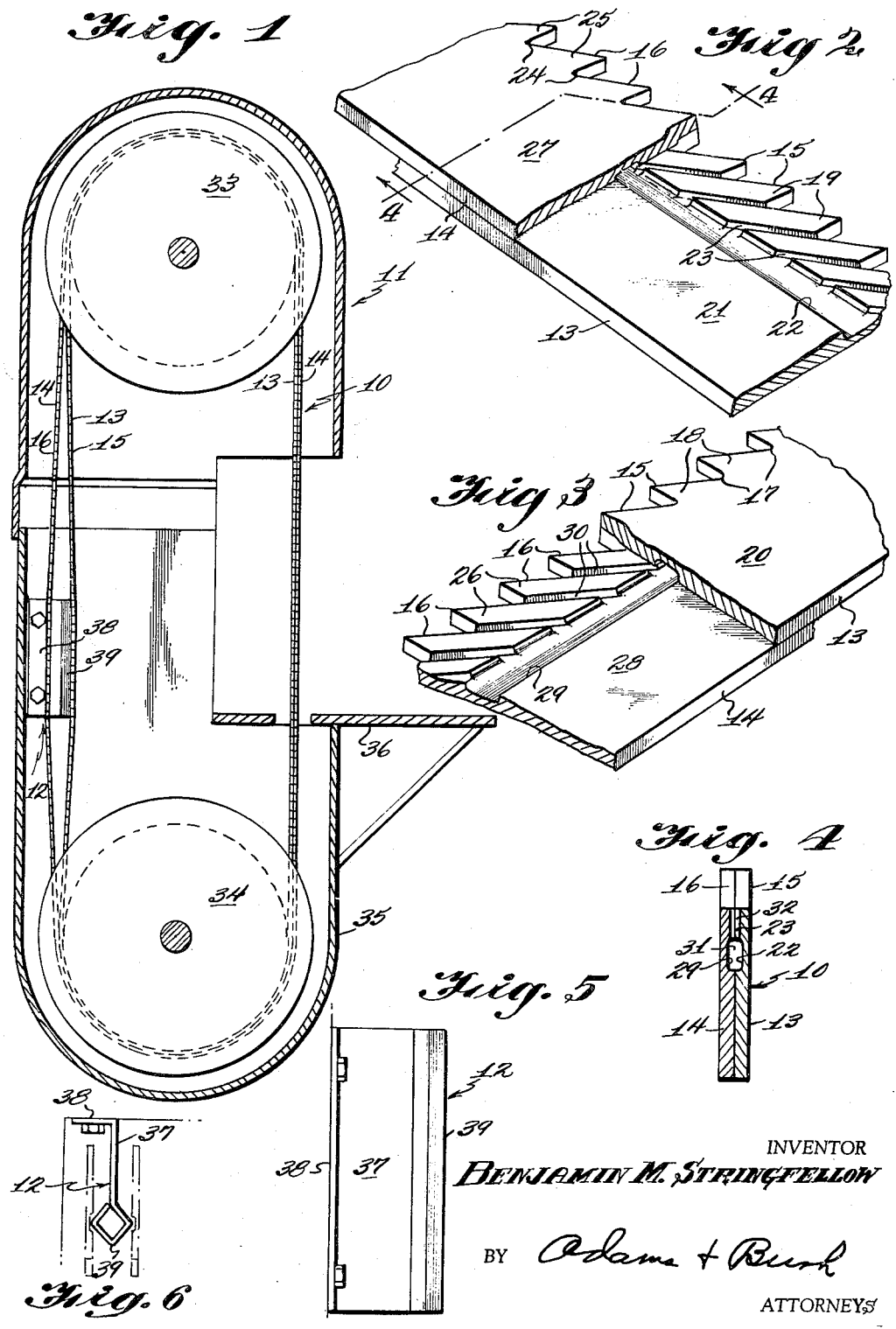
INVENTOR
BENJAMIN M. STRINGFELLOW
BY Adams + Burk
ATTORNEYS United States Patent Office 2,864,411
Patented Dec. 16, 1958

2,864,411

BAND SAW BLADE FOR USE WITH POWER DRIVEN BAND SAWS FOR CUTTING MEAT

Benjamin Murray Stringfellow, Columbus, Ga., assignor to Southern Saw Service, Inc., Atlanta, Georgia Application December 13, 1957, Serial No. 702,624

4 Claims. (Cl. 143—22)

This invention relates to saws and has more particular relation to power driven band saws for cutting meat.

The ordinary band saw blades used in cutting meat make no provision for the removal of bone dust and such dust is smeared over the cut surface of the meat.

One object of the present invention is to provide a novel and improved band saw blade for use in power operated band saw meat cutting machines provided with means for preventing the bone dust from being smeared over the cut surface of the meat.

Another object of the present invention is to provide a band saw blade, as characterized above, comprising an endless band saw blade made up of twin blades, an outer blade and an inner blade, with the outer blade being superimposed on the inner blade, with the teeth of the two blades aligned with each other, and with the outer surface of the inner blade and the inner surface of the outer blade having continuous circumferential grooves formed therein, said grooves being positioned below the bases or roots of the teeth of the blades so that when the outer blade is superimposed on the inner blade the grooves will form a continuous annular trough within the composite blade, and a plurality of pairs of opposed grooves formed in these surfaces, one between each pair of teeth, forming channels leading from the gullets between the teeth into the continuous annular trough.

Other objects and advantages of the invention will appear in the following specification and accompanying drawing; wherein:

Fig. 1 is a fragmentary side elevational view, partly in cross section, of a band saw meat cutting machine showing a composite band saw blade constructed in accordance with the present invention mounted thereon, and showing a cleaning tool mounted on the machine frame for removing bone dust from the band saw blade.

Figs. 2 and 3 are enlarged fragmentary perspective views showing the insides of the two band saw blades which make up the composite blade shown in Fig. 1;

Fig. 4 is a sectional view taken on the line 4—4 of Fig. 2;

Fig. 5 is a side elevational view of the cleaning tool shown in Fig. 1; and

Fig. 6 is an end view of the cleaning tool.

The present application is a continuation-in-part of my application, Ser. No. 627,257, filed December 10, 1956.

The present invention provides a novel and improved band saw blade for use in power operated band saw meat cutting machines; one which is particularly effective in preventing bone dust from smearing the kerf of the cut meat.

In general, the band saw blade comprises a composite blade made up of twin endless band saw blades adapted to be mounted in superimposed position, one on top of the other, on the rollers of any suitable usual meat cutting machine, the contacting surfaces of the blades being provided with opposed recesses forming an annular trough in which the bone dust is received, thereby preventing it from being smeared on the cut meat.

The invention further contemplates the provision of a cleaning tool adapted to be mounted on the frame of the meat cutting machine in position to project between the contacting surfaces of the composite blade and wipe these surfaces to remove the bone dust therefrom as the blade revolves.

Referring now to the drawings, there is illustrated in Fig. 1, one embodiment of a composite endless band saw blade, indicated generally at 10, constructed in accordance with the present invention and mounted on a meat cutting machine, indicated generally at 11; and a cleaning tool, indicated generally at 12, mounted in position to remove bone dust from the composite blade. As there shown, the composite band saw blade comprises twin blades, an inner blade 13 and an outer blade 14. The outer diameter of the inner blade 13 is substantially equal to the inner diameter of the outer blade 14 so that when the twin blades are mounted on the rollers of a cutting machine, with the outer blade superimposed on the inner blade and with their outer and inner surfaces in engagement, adhesion or friction will cause the two blades to revolve as a unit.

The two blades 13 and 14 have a series of circumferentially spaced teeth 15 and 16, respectively, formed along corresponding edges of the blade. The teeth 15 on the inner blade 13 extend forwardly from the body of the blade and are provided with gullets 17 at the forward end of the root or base of each tooth. The outer and inner surfaces 18, 19 of the teeth 15 extend in a plane parallel to the outer and inner surfaces 20, 21, respectively, of the blade, so that there will be no sidewise deflection of the inner or outer surfaces of the teeth. A continuous recess 22 is formed in the outer surface of the blade 13 adjacent the toothed edge thereof; and a plurality of recesses 23 are formed in the outer surface, each connecting a gullet 17 with the circumferential recess 22.

The teeth 16 on the outer blade 14 extend forward from the body of the blade and are provided with gullets 24 at the forward end of the root or base of each tooth. The outer and inner surfaces 25, 26 of the teeth 16 extend in a plane parallel to the outer and inner surfaces 27, 28, respectively, of the blade, so that there will be no sidewise deflection of the outer and inner surfaces of the teeth.

A continuous recess 29 is formed in the inner surface of the blade 14 adjacent the toothed edge thereof, and a plurality of recesses 30 are formed in the inner surface, each connecting a gullet 24 with the circumferential recess 29.

The construction of the two blades 13 and 14 is such that when the outer blade 14 is superimposed on the inner blade 13, the circumferential recess 22 in the outer surface of the inner blade 13 will be opposite the circumferential recess 29 formed in the inner surface of the outer blade 14 and the two recesses will define a continuous annular channel or trough 31 in the composite blade (see Fig. 4). Also, the teeth 16 of the outer blade will be superimposed on the teeth 15 of the inner blade to form the teeth of the composite blade. The gullets 17 between the teeth 15 of the inner blade 13 and the gullets 24 between the teeth 16 of the outer blade will be in alignment and form the gullets of the teeth of the composite blade, and the recesses 23 in the outer surface of the inner blade 13 will be opposite the corresponding recesses 30 in the inner surface of the outer blade and form channels 32 leading from the gullets of the composite blade into the annular trough 31 formed in the composite blade.

The cutting machine 11, on which the composite blade of the invention is shown as being mounted, may be of any usual commercial type. As shown, the machine includes a vertically spaced pair of wheels or rollers 33, 34, mounted for rotation about a horizontal axis in a supporting frame, indicated generally at 35, which carries the table 36 on which the meat to be cut is supported. The lower roller 34 is rotated by the usual driving mechanism (not shown) and the two rollers are mounted in the machine so that they may be vertically adjusted with respect to each other in order that sufficient tension may be put on the band saw blade to cause it to revolve about the two rollers, with the friction between the inner blade 13 and the outer blade 14 causing the two blades to revolve and operate as a single composite blade. Obviously, additional means for creating friction between the two blades, such as corresponding ridges and recesses formed in the engaged surface of the two blades, may be employed if desired.

The manner in which the composite blade of the invention operates when mounted on the sawing machine as shown in Fig. 1, is believed apparent.

When a piece of meat containing a bone is placed on the supporting table 36 in position to be cut by the composite blade as it moves downwardly through the meat, the bone dust will pass from the gullets between the teeth through the channels formed by the recesses 23 and 30 into the continuous annular channel 31 formed by the circumferential recesses 22 and 29 and will be retained thereon, out of contact with the side walls of the kerf, until the cutting of the meat has been completed. Then, the composite blade may be separated to remove the bone dust. Preferably, however, and as shown in Fig. 1, the cleaning tool 12 provides for the continuous removal of the bone dust from the trough of the composite blade, without disassembling the composite blade.

The cleaning tool 12 is shown as comprising a plate 37 having one end bent laterally to form an attaching bracket 38 and its other end bent into a generally rectangular shape, as indicated at 39.

The bracket 38 is mounted on the machine frame on the side adjacent the idle run of the blade, the run opposite the cutting run, and so positioned that the free end of the tool will project between the inner blade and the outer blade with the rectangular shaped end 39 scraping the side walls of the blades, as shown in Fig. 1. The friction between the side walls of the blades and the cleaning tool is not sufficient to interfere with the proper operation of the machine.

From the foregoing, it readily will be seen that there has been provided a novel and improved composite endless band saw blade for use in meat cutting machines and provided with means for removing the bone dust formed in the operation of the machine.

Obviously, the invention is not restricted to the particular embodiment thereof herein shown and described.

What is claimed is:

1. In a meat cutting machine, a supporting frame, a pair of vertically spaced rollers mounted on said frame for rotation about horizontal axes, said rollers being vertically adjustable with respect to each other, and a composite endless band saw blade mounted on said rollers, said composite endless band saw blade being formed of a pair of endless blades one superimposed on the other with the inner surface of the outer blade in tight engagement with the outer surface of the inner blade, said blades having a series of teeth formed along corresponding edges and having opposed continuous circumferential recesses formed in their engaged surfaces providing a continuous annular trough within the composite blade and a plurality of opposed recesses formed in their engaged surfaces, one between each pair of teeth forming channels leading from the gullets between the teeth into said circumferential trough, whereby bone dust will pass from said gullets through said channels into said trough and be contained therein.

2. Apparatus as set forth in claim 1, including a cleaning tool mounted on said frame adjacent the idle run of said composite blade and having a cleaning end portion projecting between said pair of blades and engaging the side walls of said blades for scraping the bone dust therefrom.

3. A composite endless band saw blade for use with meat cutting machines of the type having a pair of vertically spaced and vertically adjustable rollers rotatably mounted on a frame and on which the band saw blade is mounted and is revolved by the rollers, said composite band saw blade comprising a pair of endless blades one superimposed on the other with the inner surface of the outer blade in tight engagement with the outer surface of the inner blade, said blades having a series of teeth formed along corresponding edges and having opposed continuous circumferential recesses formed in their engaged surfaces providing a continuous annular trough within the composite blade and a plurality of opposed recesses formed in their engaged surfaces, one between each pair of teeth forming channels leading from the gullets between the teeth into said circumferential trough, whereby bone dust will pass from said gullets through said channels into said trough and be contained therein.

4. A composite endless band saw blade as set forth in claim 3, wherein the teeth on the respective blades project equally and extend straight forward from the bodies of the blades on a line level to the outer surface of the bodies of the blades with the side walls of the teeth lying in the same plane as the respective side walls of the body of the blade, so that there will be no outer sidewise deflection of the teeth.

References Cited in the file of this patent

UNITED STATES PATENTS

| | | |
|---|---|---|
| 495,345 | Junge | Apr. 11, 1893 |
| 659,088 | McKenzie | Oct. 2, 1900 |
| 1,676,071 | Bolinder | July 3, 1928 |
| 1,827,490 | Spencer | Oct. 13, 1931 |
| 1,850,272 | Shaw | Mar. 22, 1932 |
| 2,549,718 | Spang | Apr. 17, 1951 |